United States Patent

Daler et al.

Patent Number: 5,807,050
Date of Patent: Sep. 15, 1998

[54] SHEET METAL ANCHOR

[75] Inventors: Helmo Daler, Lorrach; Bernd Mutz, Schopfheim, both of Germany

[73] Assignee: A. Raymond & Cie., Grenoble, France

[21] Appl. No.: 699,396

[22] Filed: Aug. 19, 1996

[30] Foreign Application Priority Data

Aug. 22, 1995 [DE] Germany ............ 195 30 782.8

[51] Int. Cl.$^6$ .................. F16B 13/04; F16B 13/06
[52] U.S. Cl. .................. 411/36; 411/55; 411/61
[58] Field of Search ................ 411/34, 36, 38, 411/55, 57, 60, 61

[56] References Cited

U.S. PATENT DOCUMENTS

| 1,208,999 | 12/1916 | Malaby . | |
|---|---|---|---|
| 2,762,252 | 9/1956 | Karitzky . | |
| 3,381,566 | 5/1968 | Passer . | |
| 3,942,407 | 3/1976 | Mortensen | 411/36 |
| 4,657,456 | 4/1987 | Anquetin . | |
| 4,861,206 | 8/1989 | Riedel | 411/36 |

FOREIGN PATENT DOCUMENTS 2191838  6/1986  United Kingdom .

*Primary Examiner*—Neill R. Wilson
*Attorney, Agent, or Firm*—Gifford, Krass, Groh, Sprinkle, Patmore, Anderson & Citkowski, P.C.

[57] ABSTRACT

An anchor for a bolt formed of a single strip of sheet metal includes a pair of opposed shell portions having helically aligned connecting strips. The shell portions extend from a bottom end of the anchor having a threaded sleeve for accepting the bolt. The free ends of the shell portions have tabs extending outwardly for engagement into the plate in which the member is being installed. The anchor is formed by first stamping a strip of metal and then bending the ends of the strip to form a cylindrical shell. Axially aligned tabs on the free ends extend into complimentary recesses to join the two shell halves together.

3 Claims, 1 Drawing Sheet

SHEET METAL ANCHOR

FIELD OF THE INVENTION

The invention pertains to a sheet metal anchor which encompasses a threaded sleeve, a shell with numerous outwardly spreadable connecting pieces and at the opposite end of the shell, tabs angled radially outward for seating the anchor at the edge of the anchor hole.

BACKGROUND OF THE INVENTION

Such a sheet metal anchor is known, for example, from DE 3,420,263 C2. The shaft of this anchor consists of two axially oriented, cylindrical end sections forming a top part and a bottom part, which are joined together by collapsible connecting pieces. A threaded sleeve is formed on the bottom part, and the top part has an outwardly extending head flange with a hole for inserting a screw.

The sheet metal anchor is made from a single strip of sheet metal in such a way that the end sections and the connecting pieces are bent around the axis of the anchor, the head flange is bent along a folding line until it comes into contact with the end section at the top and the threaded sleeve along the folding line until it comes into contact with the end section at the bottom, and both the head flange and the threaded sleeve are provided with projections for axial locking, which engage in complementary recesses in the adjoining end section.

Accordingly, the joining of the punched and preformed sections takes place in several individual steps, while only the opposing faces of the end sections come together. There exists the danger that when the anchor is used in hollow blocks, the tightening of the bolt will cause the threaded sleeve to force the bottom part apart, preventing the connecting pieces from spreading to the desired extent.

SUMMARY OF THE PRESENT INVENTION

The objective of the invention is to design the aforesaid sheet metal anchor in such a way that the shell can be joined together unproblematically and ensure a secure support of the threaded sleeve on the shaft.

SUMMARY OF THE INVENTION

Furthermore, the shell should be designed so that the expanded connecting pieces form a secure fit in both solid and hollow blocks when the screw is screwed in.

This objective is accomplished according to the invention in that the shell consists of two semicylindrical shells, which are serially formed as one piece on both sides of the threaded sleeve from a single strip of sheet metal and then brought together at the free end of the shell. The connecting pieces extend over the shells are arranged as a helical coil.

By virtue of the design of the shell portions according to the invention, the shell portions can be punched out of a relatively narrow strip of sheet metal and easily joined together. In addition, the shell portions with their coiled spreader connecting pieces provide an outstanding hold in the anchor hole of the carrier block when the bolt is tightened, regardless of whether a massive stone or a hollow block is involved or the anchor is to be fixed in a hole in a plate.

BRIEF DESCRIPTION OF THE DRAWING

Additional characteristics of the invention are contained in the appended claims and are described in greater detail below, with reference to a preferred embodiment illustrated in the appended drawings.

Depicted are.

DETAILED DESCRIPTION OF THE PREFERRED EMBODIMENT

Figure 1:
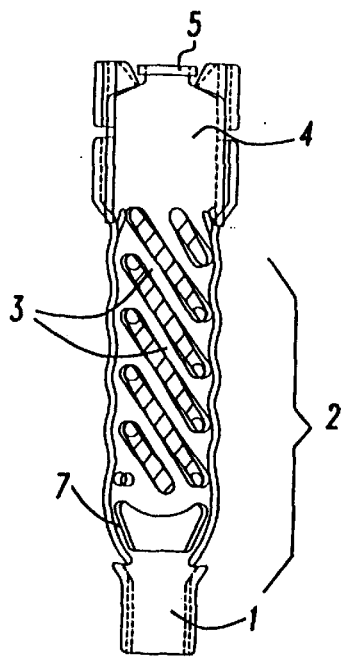
FIG. 1, the metal anchor in side view of the coiled connecting pieces.

A sheet metal anchor depicted in the figures includes a threaded sleeve 1 for screwing in a metal screw, a compressible shell 2 with spreadable connecting pieces 3, and on the opposite end of the shell a shell neck 4 on the opposite end of the shell with tabs 5 angled radially outward for tightening the anchor at the edge of the anchor hole.

Figure 2:
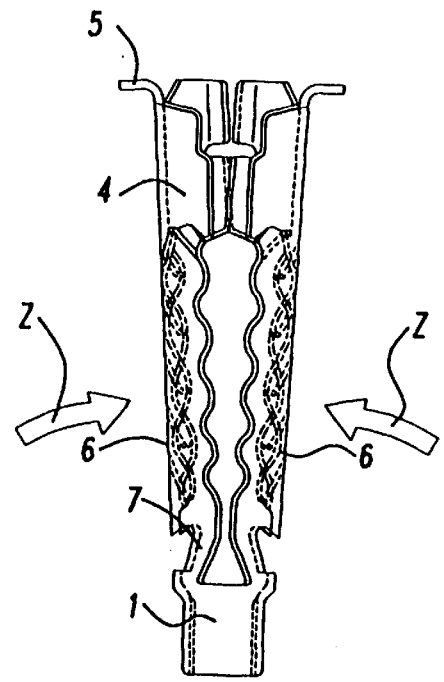
FIG. 2, the metal anchor in a side view rotated by 90°.
Figure 4:
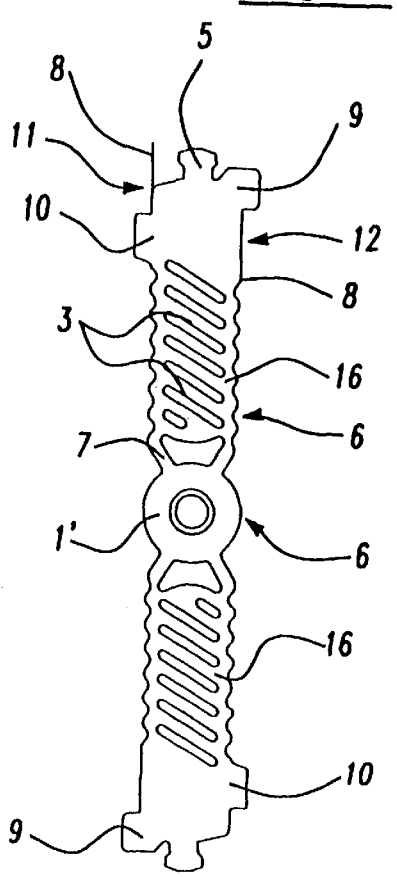
FIG. 4, the shell halves punched out of the strip of sheet metal with a symmetrically formed threaded sleeve, and FIG. 5, an installed metal anchor with cinched shell and spread connecting pieces.
Figure 3:
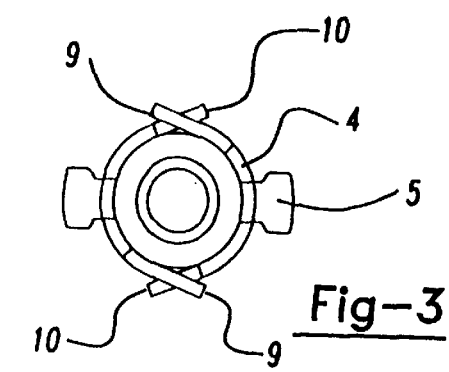
FIG. 3, the metal anchor in a top view with a look at the neck of the anchor.

The shell 2 itself consists of two semicylindrical shell portions 6, which are formed to diametrically oppose one another on the edge of the threaded sleeve 1. As shown in FIG. 4, the shell portion are serially formed from one strip of sheet metal to extend from both sides of the prepunched round plate 1' forming the threaded sleeve 1. As shown in FIG. 2, the shell portions are formed together in the direction of arrow "Z". The connecting pieces 3 extend over the entire length of the shell portions 6 extend between the narrow rim strips 16 and are preferably punched in the aforesaid strip of sheet metal obliquely with respect to the longitudinal axis, so that they are helically coiled in the semicylindrical, joined shell portions 6.

In the punched position shown in FIG. 4, each of the shell portions 6 is conveniently connected to the edge of the threaded sleeve 1 by a connecting piece 7 aligned radially with respect to the sleeve plate 1'.

Formed at the opposing edges 8 of the free ends of the shell on the shell neck 4 are tabs 9 and 10 projecting tangentially outward, which match correspondingly with wide recesses 11 and 12 on the opposing sleeve edges 8. When the shell halves 6 are brought together, the tabs 9 and 10 engage in the matching recesses 11 and 12 and extend somewhat out over the shell neck 4. Not only are the shell portions 6 fixed to the neck 4 thereby, but also the neck 4 is securely seated against turning in the anchor hole.

Figure 5:
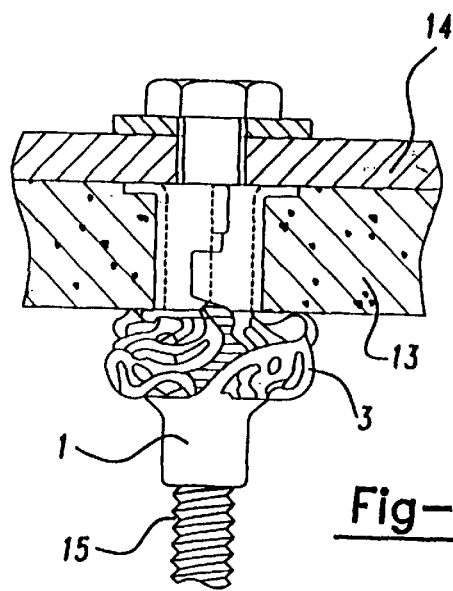

FIG. 5 shows the installed sheet metal anchor of the invention. Here the shell neck 4 of the anchor nestles in the hole of a carrier plate 13, to which another plate 14 is secured by means of a screw 15.

The threaded sleeve 1 is drawn up to the plate 13 by the screw 15 causing the shell portions 6 to spread sideways, whereby the readily deformable, coiled connecting pieces 3 effect a secure seating on the back side. It goes without saying that the shell portions 6 can flatten out equally well against the back side of the carrier plate 13 when the shaft connecting pieces 3 have a transverse or grid-like configuration.

We claim:

1. A sheet metal anchor for connecting a screw to a plate housing a hole, said anchor comprising a unitary cylindrical shell member having a threaded sleeve portion extending between inner ends of a pair of semicylindrical shell portions, said threaded sleeve formed to accept said screw, each of said shell portions having a plurality of helically positioned connecting pieces disposed between said inner end and a free end, each of said free ends being joined together and having a tab extending radially outwardly from said shell portion for seating said anchor in said plate.

2. The sheet metal anchor of claim 1 wherein each of said free ends of said pair of shell portions further has a pair of tabs and a pair of recesses, said tabs extending tangentially and received in said recesses to fix said free ends together.

3. The sheet metal anchor of claim 1 wherein said threaded sleeve portion is connected to each of said shell portions by a pair of strips which extend radially with respect to said thread portion.

* * * * *

UNITED STATES PATENT AND TRADEMARK OFFICE
CERTIFICATE OF CORRECTION

PATENT NO. : 5,807,050

DATED : September 15, 1998

INVENTOR(S) : Helmo Daler et al.

It is certified that error appears in the above-identified patent and that said Letters Patent is hereby corrected as shown below:

Column 1, Line 53 - Delete "extend", and insert - - extending - -.
Col. 2, lines 19-20 - After "4", delete "on the opposite end of the shell"

Signed and Sealed this

Twenty-third Day of February, 1999

Attest:

Q. TODD DICKINSON

*Attesting Officer*     *Acting Commissioner of Patents and Trademarks*